March 10, 1970    M. J. APPLEGATE ET AL    3,500,167
BATTERY CONDITION ANALYZER
Filed Dec. 12, 1966    3 Sheets-Sheet 1
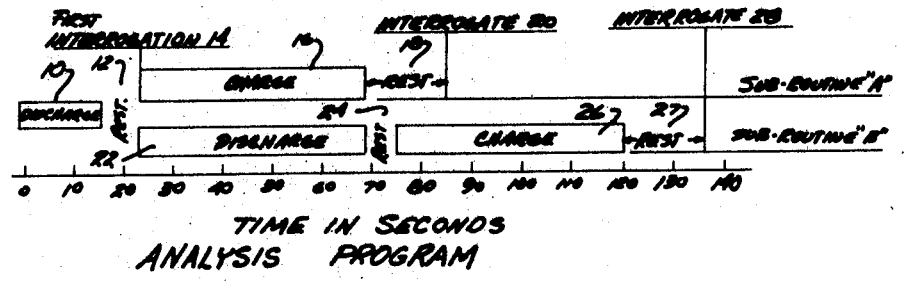
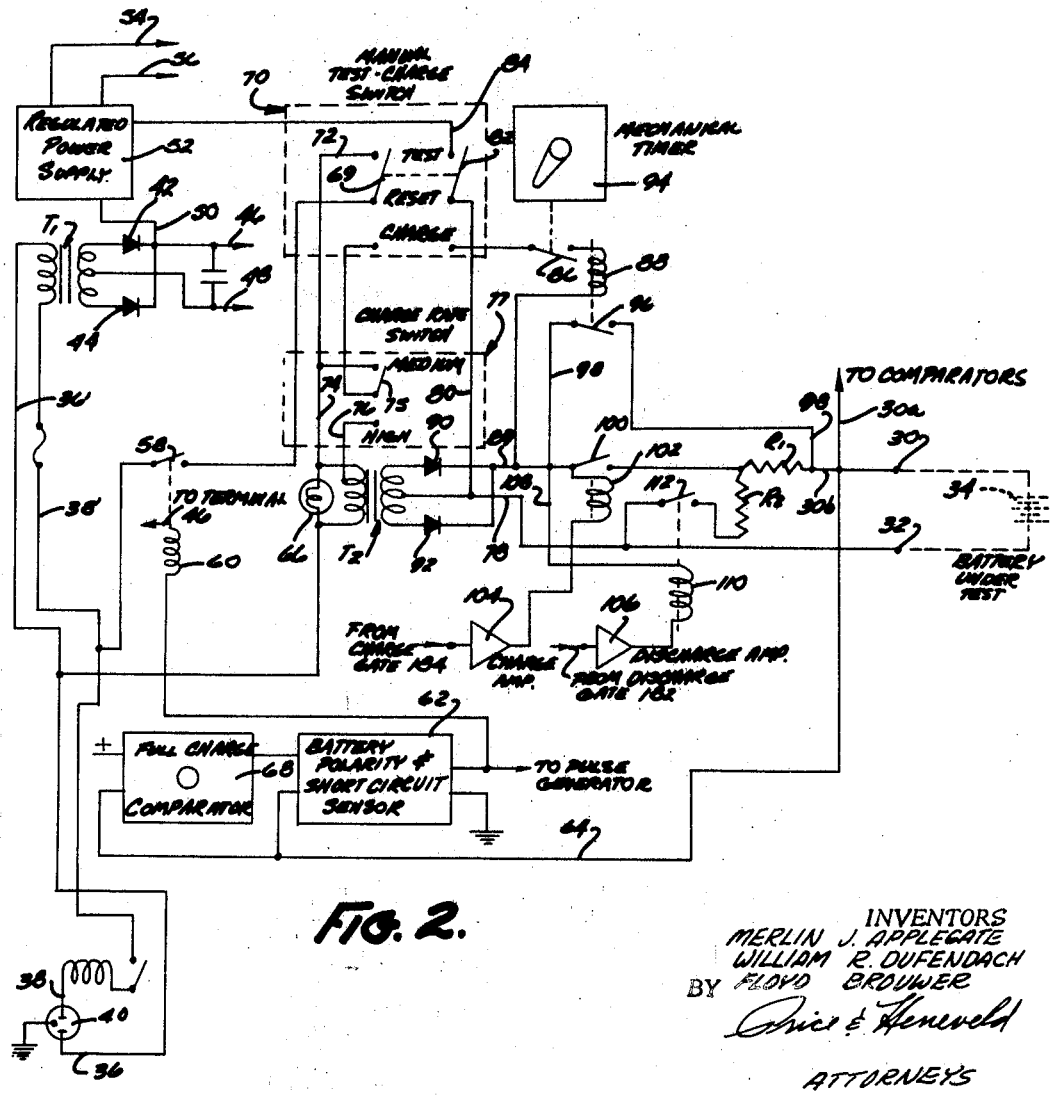
INVENTORS
MERLIN J. APPLEGATE
WILLIAM R. DUFENDACH
BY FLOYD BROUWER
ATTORNEYS

INVENTORS
MERLIN J. APPLEGATE
WILLIAM R. OUFFENDACH
FLOYD BROUWER

ATTORNEYS

3,500,167
BATTERY CONDITION ANALYZER
Merlin J. Applegate and William R. Dufendach, Grand Rapids, and Floyd Brouwer, Jenison, Mich., assignors to Vari-Tech Company, Grand Rapids, Mich., a corporation of Michigan
Filed Dec. 12, 1966, Ser. No. 600,891
Int. Cl. H02j 7/00
U.S. Cl. 320—14                    15 Claims

ABSTRACT OF THE DISCLOSURE

A programmed electronic device having a programmer provides timed signals representative of a predetermined battery analysis program and initiates its sequencing. The program causes the battery to be charged and discharged in a predetermined sequence. A function generator produces criterion signals at predetermined points in the analysis program while other circuitry senses the battery output voltage at given points in the charging and discharging sequence. Comparator logic compares the sensed battery output voltages with the generated criterion values and provides an output indicative of the comparison. A visual readout means driven by the comparator is also provided for indicating the condition of the battery.

---

This invention relates to a device for the testing or analyzing of batteries to determine their condition with respect to being chargeable or unchargeable, and more particularly it relates to an electronic device for automatically conducting, and for providing a readout display which is instantly indicative to even an unskilled person of the state of a given battery with respect to its chargeability.

Some time ago, an extensive research effort by one of the larger United States industrial corporations resulted in a testing program comprising a specific series of closely timed alternating discharging and charging steps by which the chargeability of a battery could be determined with very acceptable accuracy. This method was publicized and is now known and to some extent utilized by those skilled in the pertinent arts. In large measure, however, devices for carrying out the aforesaid method have been less than completely satisfactory because they require the operator to manually institute at least some of the charging and discharging steps in the test process. Since accurate timing of the sequence of these steps is of the essence to the process, human errors have been quite common in the use of such previous devices to the extent that the results obtained have been highly questionable. Further, the readout techniques utilized in such prior relatively unsophisticated devices have not had the desired combination of simplicity and certainty, so that the typical operator possessing only modest technical skills was very likely to incorrectly read his result, even if the method had somehow been correctly applied.

The present invention has as its major objective the provision of a fully automated and foolproof device which utilizes electronic logic techniques in combination with its own unique readout display, such that batteries may repeatedly be tested with very high accuracy, and operational errors may be substantially eliminated.

A further important object of the invention is to provide a device of the aforesaid character which includes a memory capability by which the output from a battery under test may be sampled at a given time and held in such memory until a subsequent time, when such output value may be read out of the memory and utilized for testing purposes.

A still further important object of the invention is to provide a testing apparatus of the aforesaid character which includes, in conjunction with the said memory capability, means for utilizing the remembered battery output to internally generate test criterion signals having a known and changing relationship to the remembered output value.

Another important object of the invention is to provide a testing apparatus of the aforesaid nature which includes a readout display which is held in an off or inoperable condition until the entire test is completed, so as to avoid premature and erroneous actuation, and which is further held in an on condition once properly actuated, to provide a lasting and unchanging indication of the condition of the battery.

Still another important object of the invention is to provide a test apparatus of the aforesaid character which is automatically disabled should the test battery be connected in reversed polarity, and which further provides a visual indication of such error.

An additional important object of the invention is to provide a test apparatus of the aforesaid character having manually actuable controls by which the internal circuitry used for charging the battery in the testing program may also be utilized to charge the battery subsequent to the test in the event that the test shows the battery to be chargeable and in need of charging.

The foregoing major objects of the invention and the advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

In the drawings:

FIG. 1 is a graphical representation of the analysis program which the present apparatus automatically carries out, including the two alternate sub-routines of such program;

FIG. 2 is a schematic block diagram of a first portion of the apparatus, including the power supply and the connections to the battery to be tested;

Figure 3:
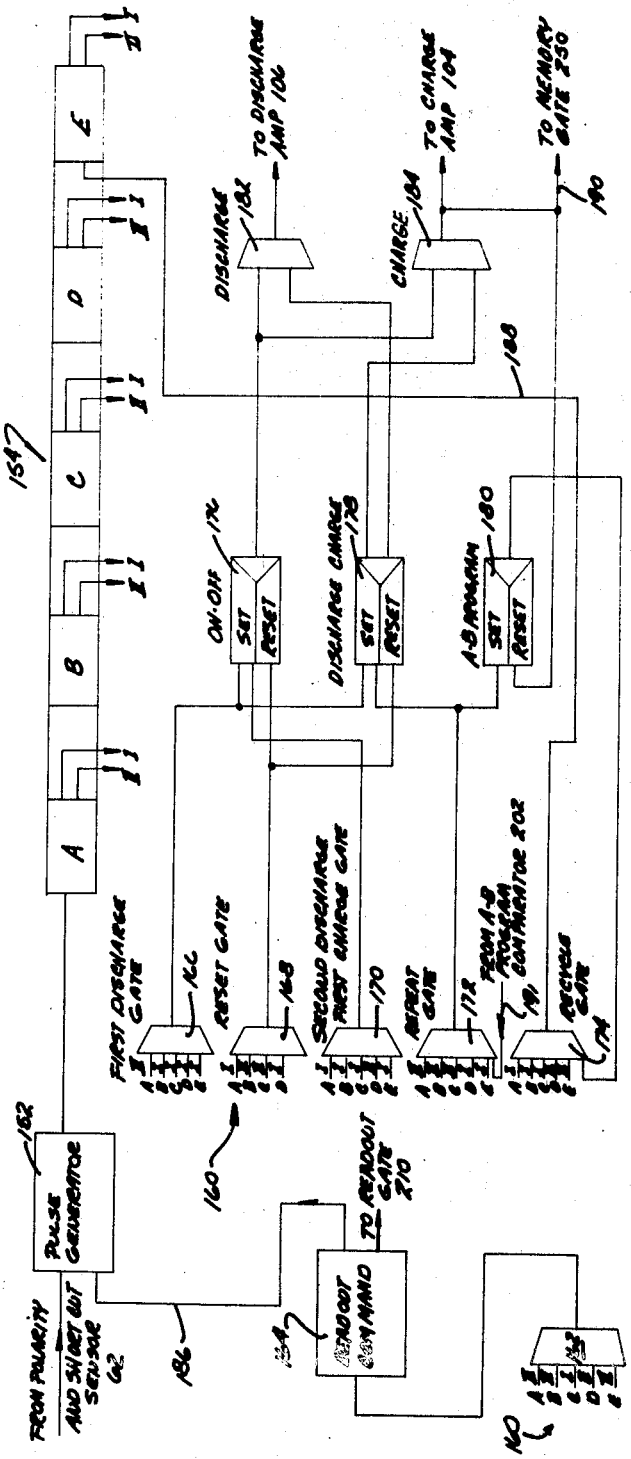
FIG. 3 is a schematic block diagram of a second portion of the apparatus, showing the comparator and readout means thereof.

Briefly stated, the present invention comprises an electronic apparatus for analyzing the condition of a battery and providing an indication thereof. The apparatus includes a timer and program means by which a sequence of time-spaced electrical signals is provided which represents a predetermined analysis program, a charging and discharging means connectable to a battery and controlled by the sequence of signals from the timer and program means such that the battery is charged and discharged in the same sequence (which represents at least a portion of the aforesaid analysis program), and a comparator and readout means connectable to the battery for sensing the output voltage thereof at a given point in said discharging and charging sequence, comparing the sensed output voltage to predetermined criterion values thereof, and providing an indication of the condition of the battery as determined by such comparing.

Referring now in more detail to the drawings, the analysis program which the present apparatus carries out is graphically illustrated in FIG. 1 and should be generally understood in order to more readily understand the apparatus of the invention. In the analysis program, the first step indicated at 10 is a discharge of the battery under test for a prescribed length of time, on the order of sixteen seconds. The battery is then "rested," i.e., neither charged nor discharged, as indicated at 12 for another prescribed period of time, on the order of seven seconds. A first interrogation 14 is then made by comparing the output of the battery at this point to a given maximum value, such as for example eleven volts, and the results of this comparison determine whether a first or normal sub-routine "A" will be followed to complete the analysis program, or whether an alternate sub-routine "B" will be followed.

In sub-routine A, the battery under test is charged as indicated at 16 for a prescribed length of time on the order of forty-six seconds, at the conclusion of which the battery is rested at 18 for a length of time on the order of sixteen seconds, and a final interrogation 20 is then made. The basis of this final interrogation determines the indication to be given by the readout display to be mentioned subsequently.

In sub-routine B, the battery is discharged at 22 for a length of time comparing to the charge 16 in sub-routine A. This is followed by a rest period indicated at 24 having a duration of approximately seven seconds, and the battery is then charged as indicated at 26 in a step directly comparable to the charge step 16 in sub-routine A, i.e., for a period on the order of forty-six seconds. At the end of the charge step 26, a final interrogation 28 is made which is directly comparable to the final interrogation 20 in sub-routine A, and the results of the interrogation 28 determine the nature of the indication provided by the readout display.

The circuitry comprising the power supply for the apparatus and including the means by which a battery is charged or discharged is illustrated in FIG. 2. The terminals 30 and 32 at the right side of this figure are for connection to a given battery to be tested, indicated in phantom at 34, and an AC power inlet path is provided by lines 36 and 38, leading from a conventional grounded plug 40, as seen at the left side of this figure. The power inlet path preferably includes a circuit breaker means 37 in inlet line 38, which may also serve as an on-off switch, and inlet lines 36 and 38 are interconnected with secondary such leads 36' and 38', which connect to the primary winding of a power transformer T1. The secondary winding of this transformer is connected in grounded center-tap configuration with a pair of rectifying diodes 42 and 44, such that DC power is provided through a pair of terminals 46 and 48. Also, power is fed through an interconnection 50 to a regulated power supply 52, from which regulated DC power is made available to other portions of the circuitry, as through outlet terminals or leads 54 and 56. As will be seen, lead 54 continuously carries such power, while lead 56 carries power only when switched through the operation of a manual test-charge switch 70.

The line power inlet leads 36 and 38 are coupled to the primary of a second transformer T2, with line conductor 38 having a series switch 58 provided by the switching contacts of a relay whose coil is seen at 60. One side of relay coil 60 connects to the DC power terminal 46 to receive power therefrom, and the other side of this coil connects to a polarity and short-circuit sensor 62. The latter is a switching component which completes a circuit to ground for the relay coil 60 upon receiving a positive signal on its input conductor 64. This signal is supplied from the terminal 30, which should normally be connected to the positive side of the battery 34 which is being tested. That is to say, if the battery is ever connected to the apparatus with reversed polarity, the negative side of the battery would then be coupled to terminal 30, and a negative signal would thus be present on conductor 64 and supplied to the input of the polarity and short-circuit sensor 62. This would cause the latter to remain in an open condition, so that the relay coil 60 would remain ungrounded and therefore in a non-actuated condition, causing switch contacts 58 to remain open and preventing input power from reaching the primary winding of transformer T2. As will be readily understood, if the battery 34 should be short-circuited internally, a similar result will occur, even if such battery is connected to the apparatus with the proper polarity.

A lamp 66 is preferably connected across the primary winding of transformer T2, such that when relay contacts 58 are open and the primary of transformer T2 is not being energized, no current will flow through lamp 66 and no visual signal will be produced thereby. Thus, lamp 66 when unlit indicates that a polarity reversal or short circuit at the battery exists. When relay contacts 58 have closed in the usual manner, however, current will flow through the primary of transformer T2 and through the lamp, and this will cause the latter to produce light. Thus, lamp 66 is lit only for proper operating conditions. In connection with the polarity and short-circuit sensor 62, it should be noted that a "full charge" comparator 68 is connected into the input of this sensor. This comparator has one input which receives the positive voltage output of the test battery from terminal 30 and conductor 64. The other input to the comparator 68 is supplied with a positive voltage of a particular magnitude selected as the maximum to which the battery is to be charged, as will be understood. Consequently, whenever a comparison is made, the polarity and short circuit sensor 62 is provided a signal by comparator 68 which causes relay coil 60 to be open-circuited, thereby opening the switch 58 in power line 38.

The primary winding of transformer T2 is connected to the relay contacts 58 and to one side of the lamp 66 through a movable contact arm 69 in a manual test-charge switch 70. As may be seen in FIG. 2, when contact 69 is in its upward or "test" position, a path is completed through leads 72 and 74 to one end of the primary winding of transformer T2. When contact arm 69 is in its lower or "charge" position, a circuit is completed to another movable contact arm 75 in a charge rate switch 77, by which a high or medium rate of charge may be selected. That is, in its upper or "medium" charge position, contact arm 75 connects to lead 74 and thence to the top of the primary winding of transformer T2. However, in its bottom or "high" charge position, contact arm 75 connects to a lead 76 which is connected to an interior point in this primary winding, i.e., a point on the winding intermediate its end extremities. This of course reduces the effective turns ratio of transformer T2 and increases the current in the secondary winding accordingly.

The secondary winding of transformer T2 is center-tapped and connected by a lead 78 to the test connector terminal 32, to which is connected the negative side of the battery 34 being tested. Also, a lead 80 which interconnects with lead 78 and the center-tap of the secondary winding is connected to a second movable contact arm 82 in the test-charge switch 70. Movable contact arm 82 is ganged to arm 69, discussed previously, for movement therewith. When contact arm 82 is in its upper or "test" position, line 84 is connected to line 78 and the center-tap of the secondary winding of transformer T2 through line 80. This connection acts through the regulated power supply 52 to switch regulated power onto output lead 56, so that this lead carries power only when contact arm 82 is in its upper or "test" position. When contact arm 82 is placed in its lower or "charge" position, the center-tap of transformer T2 is connected to one side of a normally open switch 86, the other side of which is connected to a relay coil 88. This relay coil is connected to a conductor 89 carrying positive rectified voltage from the two ends of the secondary winding of transformer T2, which each have a series-connected rectifying diode 90 or 92.

It will be observed from FIG. 2 that the switch 86 noted previously is closed by manual actuation of a mechanical timing means 94. This is a timer of a familiar type, which operates to hold the switch 86 closed for a preset length of time, after which it opens once again. Switch 86 controls the energization of relay coil 88, and this in turn controls the operation of a normally open switch 96. Switch 96 is a series component in a circuit branch 98 which interconnects conductor 89, which carries the rectified voltage from diodes 90 and 92, with a conductor 30b and test connection terminal 30, connected to the positive side of the battery 34 which is being tested.

From the foregoing description, it will be apparent that when the movable contact 82 in the test-charge switch 70 is in its lower or "charge" position and the timer 94 is then manually operated to close switch 86, an energizing circuit for relay coil 88 is completed from conductor 89 through the relay coil and switch 86 through the contact arm 82, and back to the center-tap of the secondary winding of transformer T2. This closes the relay contacts 96 and completes a circuit through conductor 98, thereby connecting positive rectified voltage from conductor 89 directly to the positive side of the battery 34, for the purpose of charging the battery.

The battery may also be charged by the closing of a set of relay contacts 100 which are controlled by a relay coil 102. This coil is connected between the positive voltage conductor 89 and a control amplifier 104, such that a signal to the input of the control amplifier results in a switching of the amplifier which produces a closed circuit through relay coil 102. When relay contacts 100 are closed by energizing coil 102, a circuit is closed from the power conductor 89 through a current-limiting resistor R1 and through conductor 30b and terminal 30 to the positive side of the battery 34. Charging of the battery in this manner is for the purpose of carrying out portions of the analysis program, noted previously.

Discharge portions of the analysis program are carried out in a manner similar to the charge portions just noted. That is, an input signal to a control amplifier 106 from a "discharge gate" 182, to be discussed subsequently, completes a circuit from the power conductor 89 through a lead 108 and a relay coil 110, thereby closing a set of relay contacts 112 and completing a discharge path from the positive terminal 30 for the battery 34 through conductor 30b, resistor R1 noted previously, a relatively large value discharging resistor R2, through the switching contacts 112, and to the negative side of the battery 34 through terminal 32; it being understood that when this discharge path is closed, the charge paths through relay contacts 100 or switching contacts 96 are open, and vice versa.

The timer and program means portion of the apparatus is illustrated in FIG. 3, where it is designated generally by the numeral 150. The timer portion of the means 150 includes a pulse generator 152 and a recirculating type binary counter 154, which is comprised of a series of interconnected bi-stable triggering elements or flip flops designated A, B, C, D, and E, each having a pair of output terminals I and II which alternate between zero and one signal conditions as the flip-flops are triggered. The interconnection of the flip flops A, B, C, D, and E is such that the "on" or "one" output condition of each triggers the next suceeding element from one output signal condition to the other, and consequently the counter 154 may be said to receive a typical regular train of pulses from the pulse generator 152 and produce at preselected output terminals or combinations of output terminals a particular sequence of time-spaced signals which, when logically correlated, are made representative of a desired program; specifically, the analysis program illustrated in FIG. 1 described previously.

The timer and program means 150 includes a program logic portion 160 by which the aforesaid logical correlation is carried out. The program logic portion 160 is comprised of a series of NOR-type logic gates having plural inputs, together with a number of bi-stable triggering elements or flip flops inter-connected with the gates to operate in conjunction therewith. More specifically, the program logic portion 160 includes a "test complete" gate 162 which feeds into a "readout command" buffer or clamping circuit 164; a "first discharge" gate 166, a "reset" gate 168, a "second discharge-first charge" gate 170, a "repeat" gate 172, and a "recycle" gate 174, all of which are interconnected in different ways with an "on-off" flip flop 176, a "discharge-charge" flip flop 178, and an "A–B program" flip flop 180, in the following manner.

The first discharge gate 166 feeds into both the "set" input of flip flop 176, which also receives the output of the second discharge-first charge gate 170, and the "set" input of flip flop 178, which also receives signals from the repeat gate 172. The reset gate 168 is coupled to the "reset" input of the flip flop 176 and also to the "reset" input of flip flop 178. The second discharge-first charge gate 170 feeds only the "set input of flip flop 176, as has been stated. The "repeat" gate 172 feeds the "set" input of the A–B program flip flop 180 in addition to feeding into the "set" input of flip flop 178. The recycle gate 174 receives the output of the A–B program flip flop 180 as one of its inputs, and feeds a triggering input to flip flop E in the binary counter 154, such that whenever all of the inputs of recycle gate 174 are properly enabled to produce an output therefrom, this output will always produce an "off" or "zero" condition at output terminal I of flip flop element E. The on-off flip flop 176 and the discharge-charge flip flop 178 are each connected to one of the inputs of a discharge-initiating NOR gate 182, and each of these flip flops are also connected to the inputs of a charge-initiating gate 184. Discharge gate 182 supplies signals to the discharge amplifier 106 seen in FIG. 2, whereas the charge gate 184 supplies signals to both the charge amplifier 104 seen in FIG. 2 and the memory gate 250 seen in FIG. 4 and described subsequently.

Figures 4, 5:
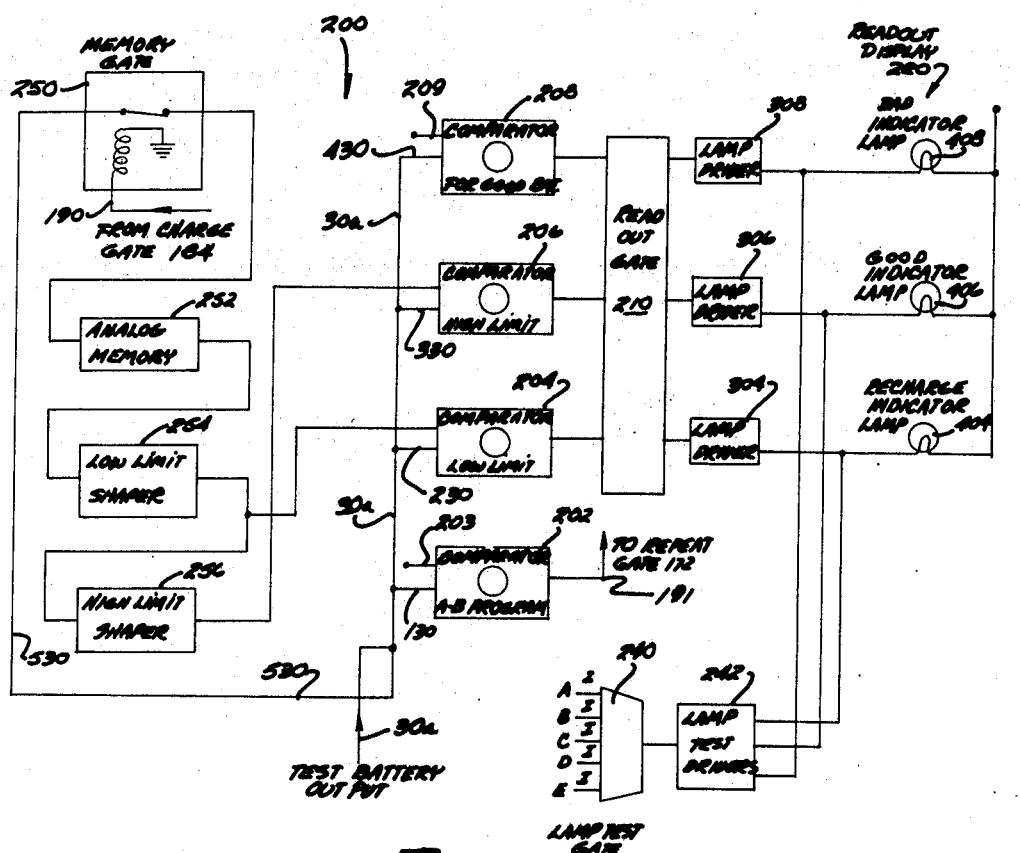
FIG. 4 is a schematic block diagram of a third portion of the apparatus, showing the timer and program means thereof.
FIG. 5 is a graphical representation of criterion values of battery output voltage, by comparison with which the condition of a battery may be determined.

As will be observed from FIG. 3, the gates 162, 166, 168, 170, 172, and 174 within the program logic portion 160 of the timer and program means 150 are all multiple-inlet logic elements or component groupings whose different inputs are taken from combinations of the outputs of the flip flops A, B, C, D, or E in the counter 154. These gates are all of the "NOR" type which provide a logical one output only when each input of a given gate carries a logical zero signal condition from the particular output terminal of the particular flip flop element within the counter 154 to which the gate inputs are connected. These particular connections are clearly labeled in FIG. 3. As a specific example, at the moment when output terminal II of flip flop A in the counter carries a logical zero signal condition and output terminal I of flip flop elements B, C, D, and E all carry a similar output signal condition, and only at this moment, the first discharge gate 166 will be fully enabled and will provide a logical one output to the "set" input of both the on-off flip flop 176 and the discharge-charge flip flop 178. Each of the gates 162, 166, 168, 170, 172, and 174, as well as the "lamp test" gate 240 seen in FIG. 4, operate in a similar manner upon receiving a logical zero signal condition at each input terminal. It is to be noted that in addition to signals from the timer 154, the repeat gate 172 receives one input signal condition from an A–B program comparator element 202 which is illustrated in FIG. 4 and which will be mentioned subsequently. As will be understood, this input, like the others of this gate, must receive a zero signal condition from the aforesaid comparator before the repeat gate 172 will provide a one signal at its output. In a similar manner, the recycle gate 174 receives one input from the A–B program flip flop 180, which input must also be of a zero condition before gate 174 will provide a signal condition of one at its output.

As may be apparent from the foregoing description of the elements and interconnections making up the timer and program means 150, binary signals from the counter 154 are received in various predetermined time-spaced patterns and logically correlated by the gates 162, 166, 168, 170, 172, and 174 and the flip flops 176, 178 and 180 which they feed, such that these elements in conjunction with the discharge and charge gates 182 and 184, respectively, supply output signals to properly carry out the analysis program of FIG. 1.

For example, when all of the inputs of the first discharge gate 166 are receiving signals of a logical zero condition from the binary counter 154, this gate energizes the "set" inputs of both flip flops 176 and 178. Flip flop 176 then provides a logical zero signal condition to the top input of both the discharge gate 182 and the charge gate 184. At the same time, flip flop 178 provides a logical one signal to the charge gate 184 and a logical zero signal to the discharge gate 182. Thus, the discharge gate has a zero signal condition at both inputs, and it therefore provides a signal of one at its output. Since the charge gate 184 has a zero on one input and a one on the other, it does not provide an output, i.e., its output terminal carries a logical zero. The positive signal at the output of the discharge gate 182 is, as labeled in FIG. 3, coupled to the discharge amplifier 106 illustrated in FIG. 2 and noted previously, thereby producing a discharging of the battery 34 which is under test. This discharging corresponds to the first discharge step 10 of the analysis program seen in FIG. 1. Under these conditions, the charge gate 184 is not fully enabled, and consequently no signal is provided to the charge amplifier 104.

The initial discharging of the battery just described continues until some change occurs in the output condition of the discharge and charge gates 182 and 184, which can only be instituted by changng the set or reset condition of the on-off flip flop 176 or the discharge-charge flip flop 178. An appropriate arrangement of outputs from the binary counter 154 is therefore selected to be coupled to the reset gate 168 (as labeled in FIG. 3) to produce a logical one signal condition at its output at the conclusion of the duration of the discharge step 10 indicated in FIG. 1. This signal condition from reset gate 168 causes both the on-off flip flop 176 and the discharge-charge flip flop 178 to be reset. The previous signal conditions at the output terminals of both these flip flops are thus reversed. This places a logical one signal on both the input terminals of the discharge gate 182, and places a logical one on the upper terminal of the charge gate 184 with a logical zero on the bottom input terminal thereof. Since neither gate 182 nor 184 now has both its inputs at zero signal conditions, the output previously present from the discharge gate 182 is now removed, while the output of the charge gate 184 remains as before, i.e., having no output. Thus, neither of these gates provides an output, and the battery under test is at a rest condition until the flip flops 176 and 178 and the charge and discharge gates which they control are once again changed. This rest condition is indicated at 12 in FIG. 1.

At the conclusion of the rest period 12 in the analysis program, a first interrogation of the battery output is made, as indicated at 14 in FIG. 1. In this interrogation, the battery output after the discharge 10 is compared to a predetermined maximum allowable voltage (on the order of eleven volts, for a twelve-volt battery) by an A–B program comparator 202 seen in FIG. 4. If the battery output voltage then present exceeds this value, comparator 202 provides a logical zero signal condition to the lowermost input of the repeat gate 172. This causes sub-routine B of the analysis program of FIG. 1 to be instituted, in a manner to be described subsequently. If no comparison is made, however, comparator 202 continues to provide a logical one signal to the said input of the repeat gate, under which conditon this gate provides no output which would change the discharge-charge flip flop 178 from its reset to its set condition.

Assuming the latter situation to be true, the signal condition next supplied from the counter 154 is chosen to fully enable the second discharge-first charge gate 170, and cause a signal condition of one to be gated thereby to the set input of the on-off flip flop 176. This flip flop then produces the zero output condition noted previously in connection with the first discharge step 10, and consequently the top input terminal of both the discharge gate 182 and the charge gate 184 receive a zero signal condition. The bottom input terminals of these two gates continue to receive the same signal condition from the discharge-charge flip flop 178 as was true during the rest period 12, however, i.e., the discharge gate receives a logical one, while the charge gate receives a logical zero. This places a one-one signal condition on the discharge gate 182, and consequently this gate provides a zero output which does not actuate the discharge amplifier 106 of FIG. 2. The charge gate 184, on the other hand, now has a zero-zero signal condition, causing it to provide a positive one output to the charge amplifier 104. This actuates the charge amplifier and connects relay 102 to ground, thereby initiating charging of the battery 34. This corresponds to the charge step 16 in sub-routine A of the analysis program.

At a desired interval subsequent to the initiation of charge step 16, the signal conditions from the counter 154 once again are such as to fully enable the reset gate 168, which thereupon provides a logical one output to the reset terminals of both the on-off flip flop 176 and the discharge-charge flip flop 178. This removes the logical zero signal condition from the top terminal of both the discharge gate 182 and charge gate 184, which previously was present at these terminals during the charging step 16, and replaces it with a logical one signal condition. This makes the two inputs of the discharge gate 182 carry identical one signal conditions, precluding an output from this gate, and it makes the two input terminals of the charge gate 184 carry a one-zero condition, precluding an output from this gate. This institutes the rest step 18 of the analysis program.

During the rest step 18, a variety of comparisons are made between the output at that moment of the battery under test and certain criterion values, in order to provide a readout indication of the condition of the battery with respect to such criterion values. The rest step 18 is ended by the "test complete" gate 162 when the latter becomes fully enabled by selected output signals from the counter 154 occurring at a desired instant, thereby providing a logical one signal from the test complete gate to the readout command component 164. This component then provides a clamping output signal which is conducted to the pulse generator 152 on conductor 186 and which causes the pulse generator to cease the pulse train which it has been supplying to the counter 154. Also, a similar signal is conducted from the readout command component 164 to a readout gate 210 shown in FIG. 4 and described subsequently in connection therewith. Upon receiving this signal the said readout gate allows a signal to pass from one particular comparator in an array thereof to a visual readout display, to be described subsequently. Thus, analysis program "A" will have been completed.

If at the conclusion of the rest step 12 in the analysis program the first interrogation 14 shows that the battery under test is exceeding the critical value noted previously, a steady logical zero signal will be supplied from the A–B program comparator 202 to the lowermost terminal of the repeat gate 172. The other input terminals of this gate become fully enabled by signals from the counter 154 a brief instant before the counter fully enables the second discharge-first charge gate 170, which will commence either a charge corresponding to step 16 in the analysis program or discharge corresponding to step 22. As will be recalled, such a charge or discharge is caused by energizing the set terminal of the on-off flip-flop 176, as was noted above in connection with sub-routine A, wherein the A–B program comparator 202 did not provide the necessary zero signal condition to fully enable repeat gate 172. When the repeat gate 172 is fully enabled, however, it produces a logical one signal condition at its output which is coupled to the set inputs of both the discharge-charge flip-flop 178 and the A-B program flip-flop 180. This causes the former to provide an output signal to the charge gate 184 and discharge gate 182 which is identical to the signal conditions initiated by the first discharge gate 166 which, as will be remembered, cause the initial discharge step 10. Thus, when the second discharge-first charge gate 170 is fully enabled by signals from the counter 154 immediately after the repeat gate 172, both the on-off flip-flop 176 and the discharge-charge flip-flop 178 are in a condition identical to that brought about by a signal from the first discharge gate 166, even though this gate is not at this time enabled. Consequently, the discharge gate 182 produces a logical one signal output whereas the charge gate 184 does not. This causes sub-routine B of the analysis program to be instituted by initiating the discharge step 22.

It will be remembered that the A-B program flip-flop 180 was set by the repeat gate 172 at the same time that this gate set flip-flops 176 and 178 and thereby produced the discharge step 22 in the analysis program. Thus, the A-B program flip-flop 180 provides a steady logical zero signal to the lowermost input of the recycle gate 174 during the discharge step 22. This discharge step is terminated by the reset gate 168, which becomes fully enabled at the instant in time at which either the charge step 16 or the discharge step 22 is to end, whichever is currently happening. As has been stated above in connection with sub-routine A, reset gate 168 operates to send a logical one signal to the reset terminals of both the on-off flip-flop 176 and the discharge-charge flip-flop 178, thereby making the output from both the discharge and the charge gates 182 and 184 assume a logical zero condition which precludes operation of either the charge amplifier 104 or the discharge amplifier 106 and prevents corresponding charging or discharging of the battery under test. In this manner, the discharge step 22 in sub-routine B is ended and rest period 24 commences.

As will be observed, only a logical one signal condition from the charge gate 184 can reset the A-B program flip-flop 180. Consequently, this element remains set during the rest program 24, providing a continuing logical zero condition to the lowermost or sixth input of the recycle gate 174. At the conclusion of the desired rest step 24, the remaining inputs of the recycle gate 174 become enabled by signals from the counter 154, and this gate then supplies a logical one output condition on conductor 188, which leads to the input of triggering element E in the counter 154. It will be observed from FIG. 3 that the fifth input terminal of the recycle gate 174 is connected to output terminal II of counter element E, and it necessarily follows that this output terminal of the counter must have a logical zero output condition in order to fully enable the recycle gate and cause the aforesaid logical one signal condition on conductor 188, which causes a triggering of element E. This triggering changes the output conditions prevailing on the two output terminals of element E, so that terminal II then carries a logical one condition while terminal I carries a logical zero condition. This of course changes the conditions at the input of the recycle gate 174 so that this gate is no longer fully enabled.

Inspection of the five input connections to the second discharge-first charge gate 170 will reveal that they are identical with the first five inputs of the recycle gate 174, with the exception that the fifth input of the former is connected to output terminal I of counter element E, whereas the fifth input of the recycle gate is, as has been stated, connected to output terminal II of counter element E. Consequently, the aforesaid triggering of counter element E by a signal from the recycle gate 174 on conductor 188 turns the recycle gate off and turns the second discharge-first charge gate 170 on. The latter then supplies a logical one signal condition to the set input of the on-off flip-flop 176. This brings about the identical conditions within the program logic means 160 that produce the charge step 16 in the sub-routine A of the analysis program, and these conditions now produce the charge step 26 in sub-routine B.

In initiating charge step 26, the charge gate 184 is enabled, and this sends a signal to the reset input of the A-B program flip-flop 180, thereby removing the logical zero signal condition it has been supplying to the lowermost input terminal of the recycle gate 174. Also, the positive output from the charge gate 184 which actuates the charge amplifier 104 is simultaneously conducted on a lead 190 to a memory gate 250 illustrated in FIG. 4 and discussed subsequently. It is to be noted here, however, that this signal will actuate the said memory gate upon the commencement of any charge step, whether it be charge step 26 in sub-routine B or charge step 16 in sub-routine A.

Upon the conclusion of the desired duration for charge step 26, output conditions from the counter 154 again fully enable the reset gate 168. As has been stated, when this gate is fully enabled it causes the flip flops 176 and 178 to present input conditions to the discharge gate 182 and the charge gate 184 which preclude the occurrence of a positive output from either thereof. Thus, the battery under test enters a final rest period or step 27 in the analysis program prior to final interrogation. Operation of the counter 154 determines the duration of the rest period 27, which is substantially equal in time to rest period 18 which occurred at the conclusion of sub-routine A. Just as at the end of rest step or period 18, rest period 27 is concluded by output signal conditions from the counter 154 which fully enable the "test complete" gate 162, which subsequent signals from the readout command component 164 causing termination of the operation of the pulse generator 152 and operation of the readout gate 210 in FIG. 4 which triggers a visual display of the test results.

The comparator and readout means of the invention, mentioned several times hereinabove, is illustrated in FIG. 4, where it is indicated generally by the numeral 200. The output voltage of the battery under test is coupled from the positive terminal 30 of the battery to the comparator and readout means on conductor 30a seen also in FIG. 2, from which a series of conductors 130, 230, 330, and 430 connect the battery output to a series of comparator components. These include an A-B program comparator 202, a low-limit comparator 204, a high-limit comparator 206, and a good-battery comparator 208, all of whose functions will be seen subsequently. As will be understood, each of the aforesaid comparator components makes a comparison of the battery output with a criterion value and provides an output if, but only if, a predetermined comparison or match exists.

More specifically, the A-B program comparator 202 receives a constant voltage on its input terminal 203, which is the criterion for a maximum allowable output which the battery may have at the conclusion of the rest step 12 in the analysis program. The first interrogation 14 indicated in FIG. 1, which determines whether sub-routine A or sub-routine B will be followed, represents the comparing function of comparator 202. Similarly, the good battery comparator 208 receives a constant criterion value voltage input on its terminal 209, which it compares with the output from the battery under test. The nature of this criterion value voltage will be noted in more detail subsequently. Unlike the A-B program comparator 202, the good-battery comparator 208 does not connect its output directly to the parts of the apparatus seen in other figures. Instead, the output of comparator 202, like the outputs from comparators 204 and 206, is coupled into a readout gate 210 which, when actuated by a command from the readout-command element 164 of FIG. 3, performs straightforward NOR-type logic on the outputs from comparators 204, 206, and 208 simultaneously, such that whichever one thereof makes the predetermined comparison and provides a logical zero output will, through the readout gate 210, cause energization of a particular one of a series of lamp driver components 304, 306, and 308, which may be controlled rectifier elements. Energization of any of the lamp driver components causes corresponding energization of any of a series of indicator lamps 404, 406, and 408, which together form a visual readout display 220.

As shown in FIG. 4, a lamp test gate 240 is provided which feeds into a lamp test driver complex 242 having three outputs, each connected to one of the indicator lamps 404, 406, and 408 in the readout display 220. Lamp test gate 240 is the same type of logic element as the NOR gates seen in FIG. 3 and described previously, and like those gates, the lamp test gate receives a plurality of binary inputs, one from each of the elements A, B, C, D, and E in the counter 154 of FIG. 3. The purpose of the lamp test gate 240 and its driver complex 242 is simply to test each of the indicator lamps 404, 406, and 408 at the beginning of the analyzing of any given battery, so as to be certain that each individual lamp is operative and will give an accurate readout indication. Thus, the output conditions from the counter 154 will fully enable the lamp test gate 240 should occur at the outset of the test, before any of the other gates are enabled. When so enabled, the lamp test gate supplies a positive or logical one output to the test drivers 242, causing them to energize the indicator lamps. As will thus be understood, the lamp test driver complex 242 may simply be comprised of an array of transistors or other analogous switching elements which are saturated or turned on by the positive signal from the lamp test gate. The interval of time for which the lamps are energized by the lamp test driver complex is determined by the interval of time between pulses supplied to the counter 154 by the pulse generator 152, which determines the length of time for which the lamp test 240 is held in a condition. This time interval is on the order of a few seconds, and is very adequate for observing whether or not the lamps light up.

The particular signals supplied to the low-limit comparator 204 and high-limit comparator 206 which represent the criterion values used by these comparators in conjunction with the battery output voltage are provided through the mutual operation of a memory gate 250, an analog memory 252, a low-limit shaper 254, and a high-limit shaper 256. As is indicated within the memory gate symbol, this component need not be a gate in the sense of being a logic element, but is preferably merely a switch such as a red relay, which is actuated by a signal on conductor 190 from the charge gate 184 seen in FIG. 3, as explained previously. When so actuated, the memory gate opens its normally closed internal contacts. Until this time, the output from the battery under test has been supplied from terminal 30 through conductors 30a and 530 to the memory gate and conducted therethrough by its internal switch contacts to the analog memory 252. Upon actuation of the memory gate 250 and the resultant opening of the internal contacts thereof, the battery output is no longer supplied to the memory 252. Consequently, the volume which this memory retains is the instantaneous value of the battery output which exists at the moment the memory gate is actuated. As will be understood, analog memory 252 may be comprised of a capacitor to be correspondingly charged by the battery output.

It is to be remembered that the signals on conductor 190 which actuate the memory gate are supplied from the charge gate 184 of FIG. 3 whenever any charge step in the analysis program is initiated. Consequently, if the timer and program means 150 dictates that sub-routine A of the analysis program is to be followed, the output of the battery existing at the commencement of charge step 16 will be the value which is stored in the analog memory 252. On the other hand, if sub-routine B is inaugurated, the analog memory will merely "follow" the changes in the instantaneous output of the battery which take place during the discharge step 22, until charge step 26 is inaugurated. The battery voltage in existence when this charge step is commenced is thus the value which the memory 252 will store for future use.

The function of the low-limit and high-limit shapers 254 and 256, respectively, is to operate on the value of test battery output stored in the analog memory 252 to produce criterion values for use by the low-limit and high-limit comparators 204 and 206, respectively, in making the comparisons already indicated for these components. In so functioning, the shapers 254 and 256 produce two series of instantaneous criterion values. Each such series forms one of the two curves shown in the graph of FIG. 5, labeled "high limit" and "low limit," respectively. As labeled there, the X-axis of this graph represents the battery output which exists just before the final charge (e.g., charge step 16 in sub-routine A or charge step 26 in sub-routine B); that is, the value of the battery output which is stored in the analog memory 252 when the memory gate 250 is suddenly opened at the commencement of either such charge. The Y-axis of the graph represents critical values of battery output which must be present in order for the battery to test within one given range or another, such as "good," "bad," or "rechargable." That is, the Y values on the graph are computed or theoretical values against which the actual output of the battery under test will be compared by the comparators 204, 206, and 208.

The "low-limit" curve of FIG. 5 is generated by the low-limit shaper 254, and the "high-limit" curve is generated by the high-limit shaper 256, both as differing functions of the value of battery output stored in the analog memory 252. It will thus be seen that the shapers may each be comprised of an amplifier whose gain function is shaped and clamped according to known techniques, so that each amplifier has an output corresponding to values on one or the other of the curves of FIG. 5 as a function of the level of the input to such amplifier, i.e., the values found along the X-axis of the graph. For example, the low-limit shaper produces an output of approximately 10.8 volts for any battery output value stored in the analog memory which is less than approximately 10.15 volts, and produces output values falling on the sloping line 258 of the "low-limit" curve for corresponding values stored in the memory in excess of 10.15 volts. The high-limit shaper 256 provides similar operation. It produces a steady output of approximately 11.5 volts for any value stored in the memory up to approximately 10.25 volts; produces outputs along the sloping portion 260 of the high-limit curve for stored values between approximately 10.25 volts and 11.25 volts; and produces outputs falling on the sloping portion 262 of the high limit curve for stored values in excess of 11.25 volts.

As has been stated, the output of the low-limit shaper 254, which corresponds to the low-limit curve of FIG. 5, is supplied to the low-limit comparator 204 (FIG. 4), which compares this output to the instantaneous value of the battery output existing at the end of the test cycle or analysis program. The output from the high-limit shaper 256 corresponding to the high-limit curve in the graph of FIG. 5 is coupled to the high-limit comparator 206 and compared to the same such instantaneous battery voltage. The high-limit and low-limit curves of the graph define an area therebetween which is divided into portions designated X and Y by a uniform criterion output level of approximately 13.1 volts. This is the constant input supplied to terminal 209 of the good-battery comparator 208, and this value is compared to the same said instantaneous battery output existing at the end of the analysis program.

The low-limit comparator 204 and the high-limit comparator 206 provide outputs to the readout gate 210 which are indicative of whether the actual battery output at the end of the analysis program is such as to place the battery within either of the category areas designated X and Y on the graph of FIG. 5. The result obtained from the good-battery comparator 208 indicates whether the final battery output is above or below the value dividing the areas X and Y. Consequently, the readout gate 210 through an ordinary logic process is able to correlate the outputs from all of the comparators and supply a signal to the particular lamp driver 304, 306, or 308 which shows whether the battery output is within either the X or the Y area, and if so, which particular area it is within.

The X area on the graph represents batteries which are not defective but which need charging. Consequently, the "recharge" indicator lamp 404 is driven if the battery under test falls in this area. The Y area on the graph indicates batteries which are not only not defective, but which further do not even need charging. Consequently, the "good" indicator lamp 406 is driven if the particular battery under test falls within the Y area. If any battery analyzes as being neither within the X nor the Y areas, it is defective and not chargeable. Consequently, the "bad" indicator lamp 408 is driven for any battery testing outside the X and Y areas of the graph.

In accordance with the foregoing, it will be entirely apparent that the apparatus of the invention automatically tests any given battery, not only to determine whether it is charged or discharged as is conventionally done by hydrometer and the like, but also to determine whether the battery can be successfully charged. Further, the apparatus provides a clear and unmistakable indication of the condition of that battery. The operation of each portion of the apparatus has already been described, and consequently the way that the entire apparatus is used will likely be quite apparent. The operator need only put the manual test-charge switch 74 shown in FIG. 2 in the upper or "test" position, and this will start the analysis program illustrated in FIG. 1, preceded by operation of the lamp test gate 240 seen in FIG. 4 and subsequent visual testing of each of the indicator lamps to make certain that they operate before the analysis program is carried further. Each portion of the analysis program is automatically carried out, including the selection of the particular sub-routine A or B required by a given battery. In a very short time, a clear and unmistakable indication of the condition of the battery is provided by the illumination of one of the indicator lamps. As stated before, the lamp drivers 304, 306, and 308 are preferably a holding type of component, so that the indicator lamp showing the condition of the battery remains lighted until the power is disconnected or the manual test-charge switch 74 is placed in the "reset" or center position. In connection with the latter, it is to be noted that, unlike battery testing or charging equipment of a conventional nature, the circuitry of the present apparatus will readily be seen to be instantly resettable back to initial or starting conditions at any time desired by an operator, such as if one or both of the terminals connecting to the battery to be tested accidentally slips from or is inadvertently removed from the battery. Again, all that is required is to place the test-charge switch 70 in its reset position and then commence the operation once again.

It should be pointed out specifically that in the event a given battery analyzes as being chargeable but requiring a charge, the apparatus of the invention may then be operated to charge such battery, in addition to merely performing the foregoing analysis program. All that need be done to charge a battery which has just been analyzed is to move the ganged contact arms 69 and 82 of the manual test-charge switch 70 to their downward position, and to select a high or medium charge rate by the contact arm 75 of the charge rate switch 77. The mechanical timer 94 is then set for a particular charging interval, and the battery begins to receive the desired charge. When the timer 94 has run for the length of time for which it was set, the contacts 86 controlled thereby will reopen, thereby terminating the charging of the battery. On the other hand, if the battery should become fully charged in advance of the time set on the timer, the full-charge comparator 68 will provide an output into the polarity and short-circuit sensor 62 which will open the current path energizing the coil of relay 60. This will cause the switch provided by relay contacts 58 to open, and will shut off the power which must pass through transformer T2 in order to charge the battery, thereby terminating the charge which has been set even though the timer 94 may not as yet have run for the selected time necessary to terminate the charge. Thus, any battery which analyzes as requiring a charge may readily be charged by simple manual actuation, and the charge will be terminated automatically upon either of two conditions.

It is entirely conceivable that upon examining the foregoing disclosure, those skilled in the art may devise embodiments of the concept involved which differ somewhat from the embodiment shown and described herein, or may make various changes in structural details to the present embodiment.

We claim:
1. An electronic analyzing apparatus for determining the condition of a battery, comprising in combination: a timer and program means for providing a sequence of time-spaced electrical signals representative of a predetermined analysis program; means connectable to a battery and controlled in response to said signals, for discharging or charging such battery in a timed sequence determined by said signals and representing at least a portion of said analysis program; means for sensing the output voltage of said battery at at least one given point in said discharging and charging sequence; function generation means for producing signals representative of battery output criterion values at a given point during said charging and discharging sequence; and comparator and readout means for receiving and comparing the sensed battery output voltages and the generated criterion value signals and providing an indication of the condition of the battery as determined by such comparing, including an indication of whether such battery is in good operating condition, an indication of whether such battery is defective, and an indication of whether such battery can be made operable by charging.

2. The analyzing apparatus defined in claim 1, wherein at least some of said criterion signals are representative of the output voltage of such battery which exists at a point in said charging and discharging sequence different than said one given point at which the output voltage is sensed for comparator usage, and wherein said sensing means includes circuitry for sampling said output voltage at said different point.

3. The analyzing apparatus defined in claim 2, wherein said other point in said discharging and charging sequence is prior in time to said given point therein, and wherein said comparator and readout means circuitry includes components forming a memory stage for receiving said sampled battery output voltage prior to the sensing of said output voltage at said given point and holding the value of the sampled voltage for subsequent utilization in said comparing.

4. The analyzing apparatus defined in claim 1, wherein said timer and program means includes a pulse generator for producing a train of electrical pulses, a counter means connected to said generator for providing output signals at preselected counts in said train, and gating means connected to said counter means for receiving said output signals and correlating the same to produce said sequence of time-spaced analysis program signals.

5. The analyzing apparatus defined in claim 4, wherein said counter means is a multi-stage binary counter and said gating means includes a plurality of logic element, at least some of said elements having plural inputs for binary signals from said counter, and such elements responding to a predetermined combination of said signals to provide a correlated output.

6. The analyzing apparatus defined in claim 1, wherein said comparator and readout means includes at least one comparator element, a readout display, and a readout gate means coupled therebetween for gating readout signals from said element to said display, said readout gate means being coupled to said timer and program means to receive certain of said time-spaced signals therefrom and being controlled as to gating operation by signals from the latter.

7. The analyzing apparatus defined in claim 6, wherein said comparator and readout means includes a plurality of individual comparator elements, each for comparing said sensed battery output voltage to different criterion values representing different battery condition criteria, and wherein said readout gate means is coupled to all of said comparator elements to gate signals from all of the same to said display.

8. The analyzing apparatus defined in claim 4, wherein some of said predetermined criterion values have a known relationship to the output voltage of such battery which exists at another point in said charging and discharging sequence, and wherein said comparator and readout means includes circuitry for sampling said output voltage at said other point and providing electrical signals corresponding to such criterion values to be used in said comparing.

9. The analyzing apparatus defined in claim 8, wherein said counter means is a multi-stage binary counter and said gating means includes a plurality of logic elements, at least some of said elements having plural inputs for binary signals from said counter, and such elements responding to a predetermined combination of said signals to provide a correlated output.

10. The analyzing apparatus defined in claim 9, wherein said comparator and readout means includes at least one comparator element, a readout display, and a readout gate means coupled therebetween for switching said element, said readout gate means being coupled to the output of one of said plural-input logic elements to be controlled thereby.

11. The analyzing apparatus defined in claim 1, wherein at least one portion of said analysis program includes a selectable sub-routine of either discharging or charging such battery dependent upon the condition thereof following an initial portion of said program; said timer and program means including at least one component for selectably varying said sequence of signals by impressing an alternate signal upon said discharging and charging means to cause either discharging or charging of such battery in response to a controlling signal supplied to such component; and said comparator and readout means including an individual comparator element for comparing the output of the battery to a particular criterion value at the conclusion of said initial portion of said program and for providing such controlling signal to such timer and program means component in response to such comparison.

12. The analyzing apparatus defined in claim 11, wherein said individual comparator element is actuated by said timer and program means to make said comparison at the conclusion of said initial program portion.

13. The analyzing apparatus defined in claim 1, further including a manually controllable switching means for controlling said discharging and charging means and causing the same to charge said battery when desired, as when said indication shows that such battery needs to be charged.

14. The analyzing apparatus defined in claim 1, further including means for testing the portions of said readout means which provide said indications prior to any of said comparing, to thereby make certain that such portions are operating properly before analysis is begun.

15. The analyzing apparatus defined in claim 14, wherein said testing means is actuated by said timer and program means and said testing forms an initial part of said analysis program.

References Cited

UNITED STATES PATENTS

| | | | |
|---|---|---|---|
| 2,675,522 | 4/1954 | Godshalk | 320—48 X |
| 3,387,200 | 6/1968 | Godshalk | 320—48 |
| 3,392,328 | 7/1968 | Figg | 320—48 X |
| 2,835,862 | 5/1958 | McNutt | 320—14 |
| 3,176,210 | 3/1965 | Bethke | 320—48 X |
| 3,305,754 | 2/1967 | Oaks et al. | 320—48 X |
| 3,278,824 | 10/1966 | Runyon | 320—48 X |
| 3,355,651 | 11/1967 | Olson | 320—48 X |

LEE T. HIX, Primary Examiner

STANLEY WEINBERG, Assistant Examiner

U.S. Cl. X.R.

320—37, 48; 324—29.5; 340—249